(12) United States Patent
Kniffin et al.

(10) Patent No.: US 8,282,149 B2
(45) Date of Patent: Oct. 9, 2012

(54) ACTIVE SUSPENSION SEAT FLOOR PLATE

(75) Inventors: Mark Kniffin, Brookline, MA (US); Christopher P. Nute, Hopkinton, MA (US); Ian Ross Clark, Watertown, MA (US)

(73) Assignee: Bose Corporation, Framingham, MA (US)

( * ) Notice: Subject to any disclaimer, the term of this patent is extended or adjusted under 35 U.S.C. 154(b) by 94 days.

(21) Appl. No.: 12/693,912

(22) Filed: Jan. 26, 2010

(65) Prior Publication Data

US 2011/0181069 A1    Jul. 28, 2011

(51) Int. Cl.
 *B60N 2/02* (2006.01)
(52) U.S. Cl. ................................ 296/65.02
(58) Field of Classification Search ............ 296/65.02, 296/204, 63; 180/68.5; 267/131; 297/216.1, 297/216.16, 216.17; 248/550, 585, 588, 248/421; 280/124.109, 788
See application file for complete search history.

(56) References Cited

U.S. PATENT DOCUMENTS

| | | | |
|---|---|---|---|
| 2,484,722 A | 10/1949 | Nickelsen et al. | |
| 3,711,149 A | 1/1973 | Carter | |
| 3,977,725 A * | 8/1976 | Tengler et al. | 297/468 |
| 3,999,800 A * | 12/1976 | Penzotti | 297/344.16 |
| 4,243,195 A * | 1/1981 | Rosenberg | 248/429 |
| 4,351,556 A * | 9/1982 | Worringer | 296/63 |
| 4,884,777 A * | 12/1989 | Sakamoto | 248/588 |
| 5,251,864 A * | 10/1993 | Itou | 248/588 |
| 5,294,085 A * | 3/1994 | Lloyd et al. | 248/562 |
| 5,326,067 A | 7/1994 | Gonzalez | |
| 5,382,082 A | 1/1995 | Fatchett | |
| 5,570,866 A * | 11/1996 | Stephens | 248/631 |
| RE35,572 E * | 7/1997 | Lloyd et al. | 248/562 |
| 5,651,585 A * | 7/1997 | Van Duser | 297/344.16 |
| 5,765,803 A * | 6/1998 | Graham | 248/624 |
| 5,873,627 A * | 2/1999 | Kosmatka et al. | 297/326 |
| 6,322,140 B1 * | 11/2001 | Jessup et al. | 297/216.17 |
| 6,481,777 B2 * | 11/2002 | Mans | 296/68.1 |
| 6,582,015 B2 * | 6/2003 | Jessup et al. | 297/216.17 |
| 6,773,049 B2 * | 8/2004 | Rupiper et al. | 296/63 |
| 6,945,505 B2 * | 9/2005 | Hohnl et al. | 248/424 |

(Continued)

FOREIGN PATENT DOCUMENTS

DE    731839 C    2/1943

(Continued)

OTHER PUBLICATIONS

Invitation to Pay Additional Fees dated Jul. 14, 2011 for PCT/US2011/022362.

(Continued)

*Primary Examiner* — Kiran B Patel
(74) *Attorney, Agent, or Firm* — Bose Corporation

(57) ABSTRACT

An active suspension seat is mounted to a floor of a vehicle with a floor plate having a lower portion through which is formed a first plurality of apertures positioned about the lower portion to correspond to the manner in which mounting features are positioned about the floor of the vehicle, and having an upper portion through which is formed a second plurality of apertures positioned about the upper portion to correspond to the manner in which apertures are positioned about a lower frame of the active suspension seat, and to enable the active suspension seat to be coupled to the floor plate by inserting fasteners through the second plurality of apertures from locations external to the lower frame.

20 Claims, 8 Drawing Sheets

U.S. PATENT DOCUMENTS

| | | | |
|---|---|---|---|
| 7,246,836 B2 * | 7/2007 | Hahn | 296/65.02 |
| 2006/0200287 A1 * | 9/2006 | Parison et al. | 701/37 |
| 2009/0256293 A1 * | 10/2009 | Ward | 267/131 |
| 2010/0052356 A1 * | 3/2010 | Lewis, II | 296/65.02 |
| 2010/0320357 A1 * | 12/2010 | Ummethala et al. | 248/550 |
| 2011/0277433 A1 * | 11/2011 | Sugden et al. | 56/10.1 |

FOREIGN PATENT DOCUMENTS

| | | | |
|---|---|---|---|
| DE | 4314975 C1 | 3/1995 | |
| EP | 0636509 A1 | 2/1995 | |
| EP | 1170169 A1 | 1/2002 | |

OTHER PUBLICATIONS

International Search Report and Written Opinion dated Nov. 28, 2011 for PCT/US2011/022362.

* cited by examiner

400
ACTIVE SUSPENSION SEAT FLOOR PLATE

TECHNICAL FIELD

This disclosure relates to the mounting and protective covering of plant suspension systems, including an actively suspended vehicle seat.

BACKGROUND

Suspended seats employing active suspension in vehicles increase driver comfort by dampening jolts felt by the driver along one or more axes as the vehicle travels. In so doing, active suspension seats have been known to provide health and safety benefits to drivers, including reduction in driver fatigue over long hours of vehicle operation. Such seats do this by isolating uncomfortable movement of the vehicle from the seat such that the seat is actively caused to move along one or more axes (usually, at least along the vertical axis) relative to the floor (or some other portion) of the vehicle.

However, the vast majority of vehicles currently in use and vehicles planned for production are not built with active suspension seats pre-installed by the vehicle manufacturer and are not built by the manufacturer with the intent to accommodate a later retrofit with active suspension seats. This can result in one or more structures within a vehicle not being made with sufficient strength and/or rigidity to properly accommodate the installation of an active suspension seat.

Currently available active suspension seats employ protective coverings for the base of such seats (i.e., portions between the seat cushions and the floor of a vehicle) that include a skirt having a flexible "bellows-type" structure (i.e., a skirt having "accordion-like" folding walls of flexible material) where the folds in the "bellows-type" structure allow the suspended portion of such seats to move (at least vertically) relative to the floor of the vehicle while covering components of the suspension of such seats to prevent dust, debris, hands and feet from entering into portions of the suspension. This is meant to ensure the proper functioning of the suspension and to prevent injury to those sitting on or beside such seats. Unfortunately, such flexible materials are subject to accelerated wear from the frequent and repeated flexing and bending at the folds caused by the movement of the suspended portion of such seats relative to the floor of the vehicle.

SUMMARY

An active suspension seat is mounted to a floor of a vehicle with a floor plate having a lower portion through which is formed a first plurality of apertures positioned about the lower portion to correspond to the manner in which mounting features are positioned about the floor of the vehicle, and having an upper portion through which is formed a second plurality of apertures positioned about the upper portion to correspond to the manner in which apertures are positioned about a lower frame of the active suspension seat, and to enable the active suspension seat to be coupled to the floor plate by inserting fasteners through the second plurality of apertures from locations external to the lower frame.

In one aspect, a floor plate to couple an active suspension seat to a floor of a vehicle includes a lower portion comprising a flat sheet of material extending within a plane and having a plurality of apertures formed therethrough that correspond to a plurality of mounting features positioned about the floor to enable the floor plate to be coupled to the floor, and an upper portion comprising a ribbon of material that is bent at two locations along the ribbon to define three portions of the ribbon and to impart a U-shape configuration to the ribbon. A long edge of the upper portion is joined to the lower portion such that the flat sheet of the lower portion and the U-shape configuration of the upper portion cooperate to form a tray having three side walls; each of the three portions of the ribbon defines a side wall; each of the three side walls extends in a plane that is perpendicular to the plane of the lower portion; and at least one of the side walls has an aperture formed therethrough that corresponds to an aperture formed in a lower frame of the active suspension seat.

Implementations may include, and are not limited to, one or more of the following features. Another plurality of apertures may be formed through the flat sheet of material of the lower portion that correspond to a plurality of mounting features positioned about another floor of another vehicle. The lower portion may further include a plurality of extensions that extend downwardly from the plane of the flat sheet of material to reach through corresponding openings formed in a layer of resilient material disposed between the floor and floor plate to engage the floor plate at locations of the mounting features. An extending portion of the flat sheet of material of the lower portion may extend outwardly from the tray formed by the flat sheet and the U-shape configuration of the upper portion beyond one of the three side walls, and at least one aperture of the plurality of apertures formed through the flat sheet of material may be formed through the extending portion. Two of the three side walls defined by the three portions of the ribbon may extend in parallel planes enabling parallel portions of the lower frame to be positioned therebetween. The three side walls may be oriented such that the tray formed by the flat sheet of the lower portion and the U-shape configuration of the upper portion opens toward the rear of the vehicle when the floor plate is coupled to the floor. The upper portion may further include a pin that is carried by one of the three side walls and that extends outwardly from the tray formed by the flat sheet of the lower portion and the U-shape configuration of the upper portion to engage a lower portion of a skirt surrounding the lower frame of the active suspension seat. Alternatively and/or additionally, the upper portion may further include an extension that is carried by one of the three side walls and that extends outwardly from the tray formed by the flat sheet of the lower portion and the U-shape configuration of the upper portion to engage a lower portion of a skirt surrounding the lower frame of the active suspension seat.

In another aspect, an active suspension seat includes an upper frame coupled to a seat cushion providing a place on which a person may sit; a lower frame; a suspension comprising suspension components and a controller that cooperate to actively suspend the upper frame relative to the lower frame; a first floor plate having a first plurality of apertures formed therethrough that correspond to a plurality mounting features positioned about a first floor of a first vehicle to enable the active suspension seat to be coupled to the first floor; and a second floor plate having a second plurality of apertures formed therethrough that correspond to a plurality of mounting features positioned about a second floor of a second vehicle to enable the active suspension seat to be coupled to the second floor, wherein the apertures of the first plurality of apertures are arranged differently from the apertures of the second plurality of apertures floor.

Implementations may include, and are not limited to, one or more of the following features. The first floor plate may include a plurality of extensions that extend downwardly from a plane of a flat sheet of material of the first floor plate to reach through corresponding openings formed in a layer of resilient material disposed between the first floor and the first floor plate to engage the first floor plate at locations of the mounting features positioned about the first floor plate. An extending portion of the flat sheet of material of the lower portion may extend outwardly from the tray formed by the flat sheet and the U-shape configuration of the upper portion beyond one of the three side walls, and at least one aperture of the plurality of apertures formed through the flat sheet of material may be formed through the extending portion. The controller may be coupled to the upper mounting frame such that the controller is actively suspended.

The first floor plate may include a lower portion comprising a flat sheet of material extending within a plane and having the first plurality of apertures formed therethrough; an upper portion comprising a ribbon of material that is bent at two locations along the ribbon to define three portions of the ribbon and to impart a U-shape configuration to the ribbon. A long edge of the upper portion may be joined to the lower portion such that the flat sheet of the lower portion and the U-shape configuration of the upper portion cooperate to form a tray having three side walls; each of the three portions of the ribbon may define a side wall; and at least one of the side walls may have an aperture formed therethrough that corresponds to an aperture formed in a lower frame of the active suspension seat.

In still another aspect, a method of installing an active suspension seat in a vehicle may include coupling a floor plate to a floor of a vehicle, wherein the floor plate has a first plurality of apertures that correspond to a plurality of mounting features positioned about the floor to enable the floor plate to be coupled to the floor; and coupling the active suspension seat to the floor plate. The floor plate may have a second plurality of apertures that correspond to a plurality of apertures formed in a lower frame of the active suspension seat to enable the active suspension seat to be coupled to the floor plate. Coupling the active suspension seat to the floor plate may include inserting fasteners through the second plurality of apertures and into the corresponding apertures of the lower frame, wherein the second plurality of apertures are located at positions on the floor plate that enable the fasteners to be inserted from locations external to the active suspension seat.

Implementations may include, and are not limited to, one or more of the following features. The method may further include coupling an upper portion of a skirt to an upper frame of the active suspension seat that is structured to be actively suspended above a lower frame of the active suspension seat, and coupling a lower portion of the skirt to the floor plate. The floor plate may include a flat sheet of material and a ribbon of material bent at two locations and joined to the flat sheet of material to form a tray having three side walls. Coupling the floor plate to the floor of the vehicle may include positioning the floor plate on the floor such that the tray having three side walls opens rearwardly. Coupling the active suspension seat to the floor plate may include positioning the lower frame between two of the three side walls; sliding the lower frame forward to engage the other one of the three side walls; and inserting a fastener through an aperture formed through one of the three side walls and at least partly into a corresponding aperture formed in the lower frame.

In yet another aspect, an active suspension seat may include an upper frame coupled to a seat cushion providing a place on which a person may sit; a lower frame; a suspension comprising at least one active suspension component; and a controller comprising at least one electronic component mounted to the upper frame to isolate the at least one electronic component from jolts encountered by a vehicle into which the active suspension seat is installed during travel of the vehicle, wherein the controller cooperates with the at least one active suspension component to actively suspend the upper frame relative to the lower frame.

Implementations may include, and are not limited to, one or more of the following features. The at least one active suspension component may be mounted to the upper frame. The at least one active suspension component may be selected from a group consisting of a linear actuator, a rotary electric motor, a pneumatic cylinder, a hydraulic cylinder, a power switching device, a fluid reservoir, and a magnet.

Other features and advantages of the invention will be apparent from the description and claims that follow.

DETAILED DESCRIPTION

It should be noted that although the following discussion and accompanying figures center on implementations of a plant suspension system in which the overall plant includes a physical plant implemented as an active suspension seat in which a person sits, what is disclosed in that discussion is also applicable to other implementations of plant suspension systems. Other possible forms of actively suspended plant include, and are not limited to, a suspended trailer floor of a tractor trailer truck, a suspended cabinet in a recreational vehicle, a suspended personnel cabin on board an airplane, a suspended pool table on board a sea vessel, and a whole suspended room on board a sea vessel. Still other possible implementations of actively suspended plant to which what is disclosed herein is applicable will be clear to those skilled in the art.

It should also be noted that although this discussion centers on suspension systems addressing jolts along substantially horizontal and/or vertical axes and/or planes, this should not be construed as a directional limitation. What is disclosed and claimed herein may be applied to suspension systems configured to address jolts occurring in any given direction, including in rotational directions, and may be applied regardless of how directions of movement are described (e.g., with reference to Cartesian, polar or other coordinate systems). Further, directional terms such as "horizontal" and "vertical" are meant to provide a form of shorthand description for structures that are substantially horizontal or vertical at a time when a vehicle is substantially level with the Earth or substantially plumb, and should not be taken as imposing a requirement of being precisely horizontal or vertical, or a requirement of remaining horizontal or vertical at all times. As those skilled in the art will readily recognize, it is not uncommon for portions of a vehicle that are oriented substantially horizontally or vertically while the vehicle is substantially level with the Earth or substantially plumb (and therefore are referred to as "horizontal" or "vertical" for ease of discussion) to cease to actually be substantially horizontal or vertical as the vehicle is operated to climb or descend inclines, or to be otherwise positioned so as to no longer be level with the Earth or substantially plumb. This same understanding also applies to other directional terms such as "upward," "downward," "forwardly" and "rearwardly."

Figure 1:
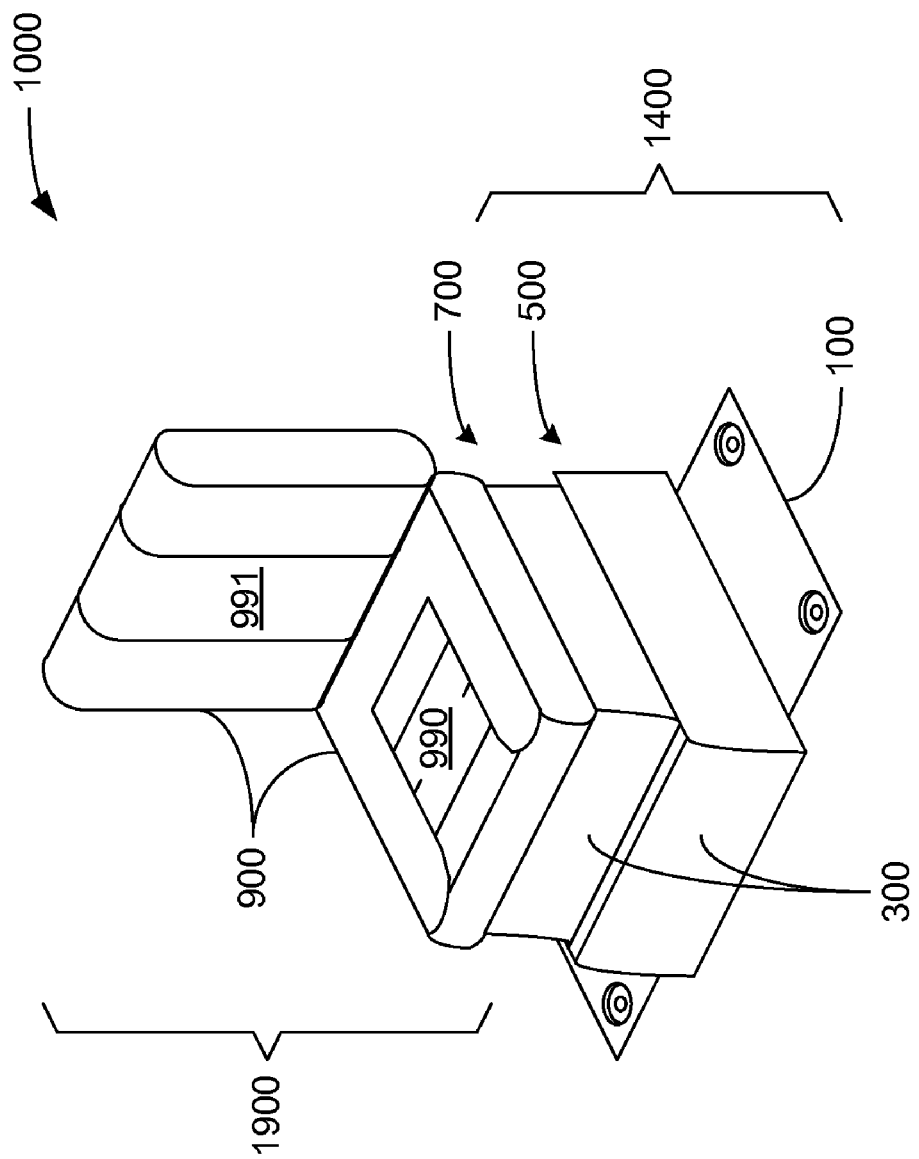
FIG. 1 is a perspective view of an active suspension seat.
Figure 2:
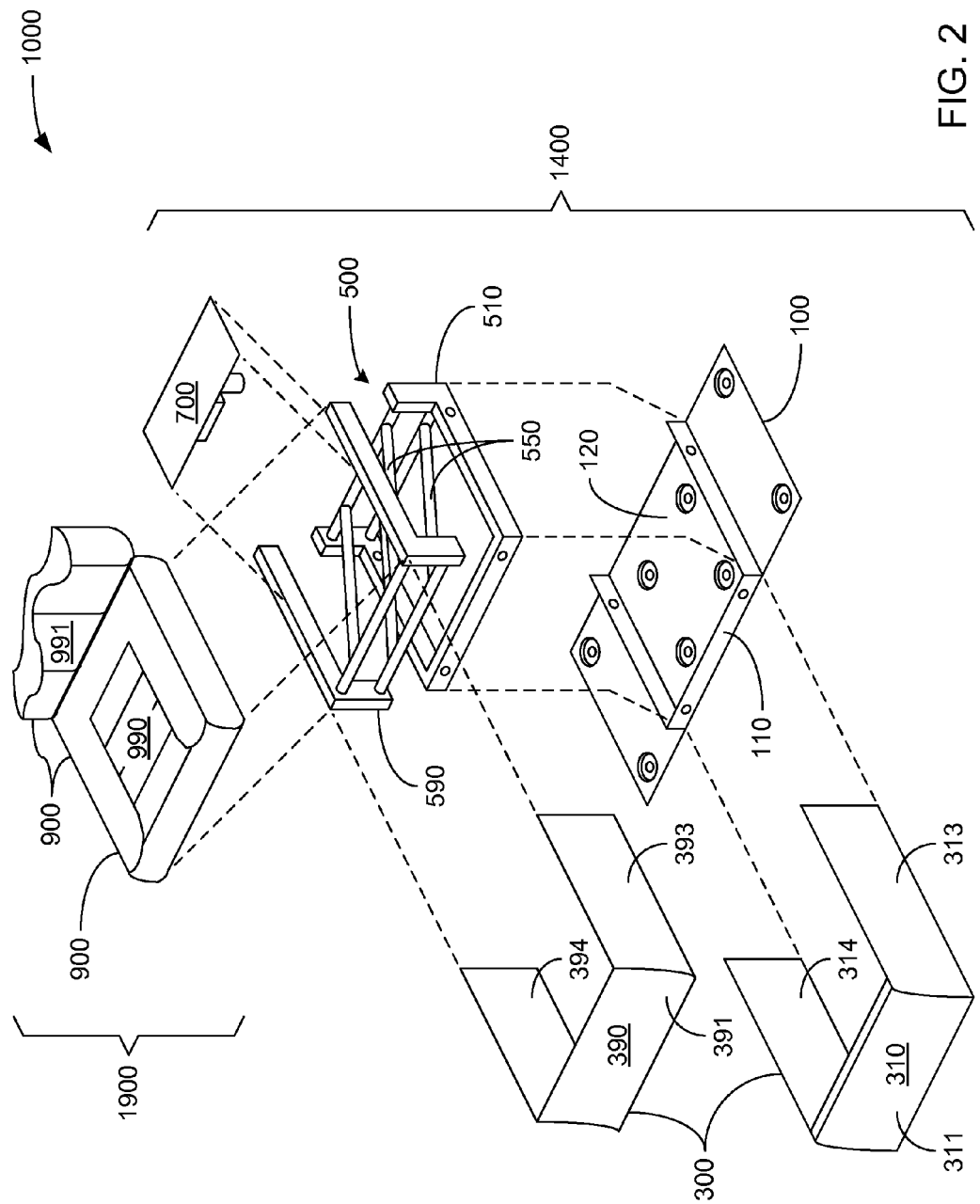
FIG. 2 is an exploded perspective view of the active suspension seat of FIG. 1.

FIGS. 1 and 2 show at least portions of a form of active suspension seat 1000 isolating a driver from jolts in the form of vehicle movement arising from forces acting on a vehicle under the driver's control as a result of the vehicle's travel over water or terrain (e.g., waves or road bumps), or through air or water (e.g., turbulence), etc. FIG. 1 is a perspective view of the active suspension seat 1000, and FIG. 2 is an exploded perspective view showing portions of the active suspension seat 1000 in greater detail. The active suspension seat 1000 incorporates a base 1400 made up of one or more of a floor plate 100, a skirt 300, a suspension 500 and controller 700. The active suspension seat 1000 also incorporates a top 1900 made up principally of a suspended portion 900, which is the portion of the active suspension seat 1000 on which a person actually sits. The floor plate 100 mounts the active suspension seat 1000 to a floor of a vehicle (not shown). The suspension 500 couples the suspended portion 900 to the floor plate 100, and provides the active suspension of the suspended portion 900 (along with whoever sits on the suspended portion) relative to the floor of the vehicle (i.e., above the floor of the vehicle). The controller 700 is coupled to and operates one or more actuators (not shown) of the suspension 500 to cause the suspension 500 to provide the active suspension of the suspended portion 900. The skirt 300 is coupled to one or both of the floor plate 100 and the suspension 500, and surrounds at least portions of the floor plate 100, the suspension 500 and/or the controller 700.

The floor plate 100 is made up of an upper portion 110 and a lower portion 120. The skirt 300 is made up principally of a lower portion 310 and an upper portion 390. The lower portion 310 of the skirt 300 is made up of at least a lower front portion 311, and perhaps one or more of a lower left portion 313, a lower right portion 314 and a lower back portion (not shown). The upper portion 390 of the skirt 300 is made up of at least an upper front portion 391, and perhaps one or more of an upper left portion 393, an upper right portion 394 and an upper back portion (not shown). The suspension 500 is made up of numerous structural supports and suspension components (e.g., suspension linkages, springs, pneumatic and/or hydraulic cylinders, rotary and/or linear motors, power supplies, etc.) of which a lower frame 510, suspension components 550 and an upper frame 590 are shown in FIG. 2. The suspended portion 900 is made up principally of a seat cushion 990 and perhaps a back cushion 991, although the suspended portion 900 may also incorporate one or more of armrests, a headrest, a seat belt, a storage bin and a cup holder (not shown). It should again be noted that these designations of "upper," "lower," "front," "left," "right," "rear," "top" and "back" are arbitrary in nature, and should not be taken as limiting of the scope of either the disclosure or claims herein. For purposes of clarity of discussion, these designations have been chosen to correspond to what would be "upper," "lower," "front," "left," "right," "rear," "top" and "back" from the perspective of a person sitting on the seat cushion 990 of the suspended portion 900.

In various possible embodiments, the seat cushion 990, the controller 700 and upper portion 390 of the skirt 300 are coupled to the upper frame 590, while the upper portion 110 of the floor plate 100 and the lower portion 310 of the skirt 300 are coupled to the lower frame 510. The lower portion 120 of the floor plate 100 couples the active suspension seat 1000 to the floor of a vehicle. As the controller 700 operates the suspension 500, including the suspension components 550, to provide active suspension, the upper frame 590 is caused to move relative to the lower frame 510. In this way, the suspended portion 900, the controller 700 and the upper portion 390 of the skirt 300 are caused to move relative to the lower portion 310 of the skirt 300, the floor plate 100 and the floor of a vehicle. The lower and upper portions 310, 390 of the skirt are sized and positioned such that the upper portion 390 telescopes into the lower portion 310 as the upper portion 390 moves relative to the lower portion 310. Thus, there are some suspension components of the suspension 500 that are, themselves, suspended by the suspension 500 relative to the floor of a vehicle, and others of the suspension components of the suspension 500 that are more directly coupled to the floor of a vehicle. Also, as will be depicted and discussed in more detail, the controller 700 and/or other mechanisms that support and/or enable the provision of active suspension by the suspension 500 may also be actively suspended.

Figure 3A:
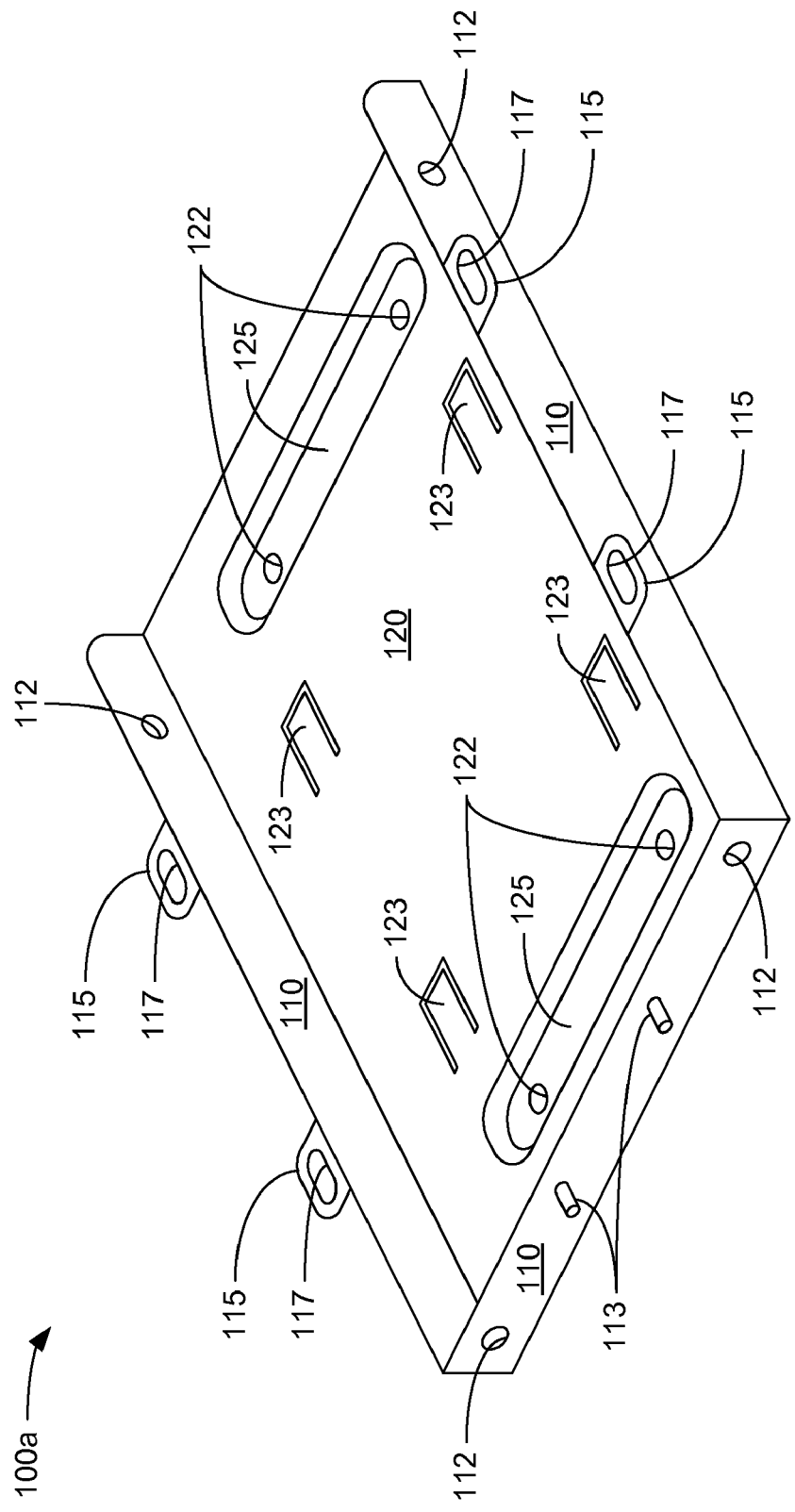
FIGS. 3a, 3b and 3c are perspective views of variants of a floor plate of the active suspension seat of FIG. 1 depicting features of each of these variants in greater detail.
Figure 3B:
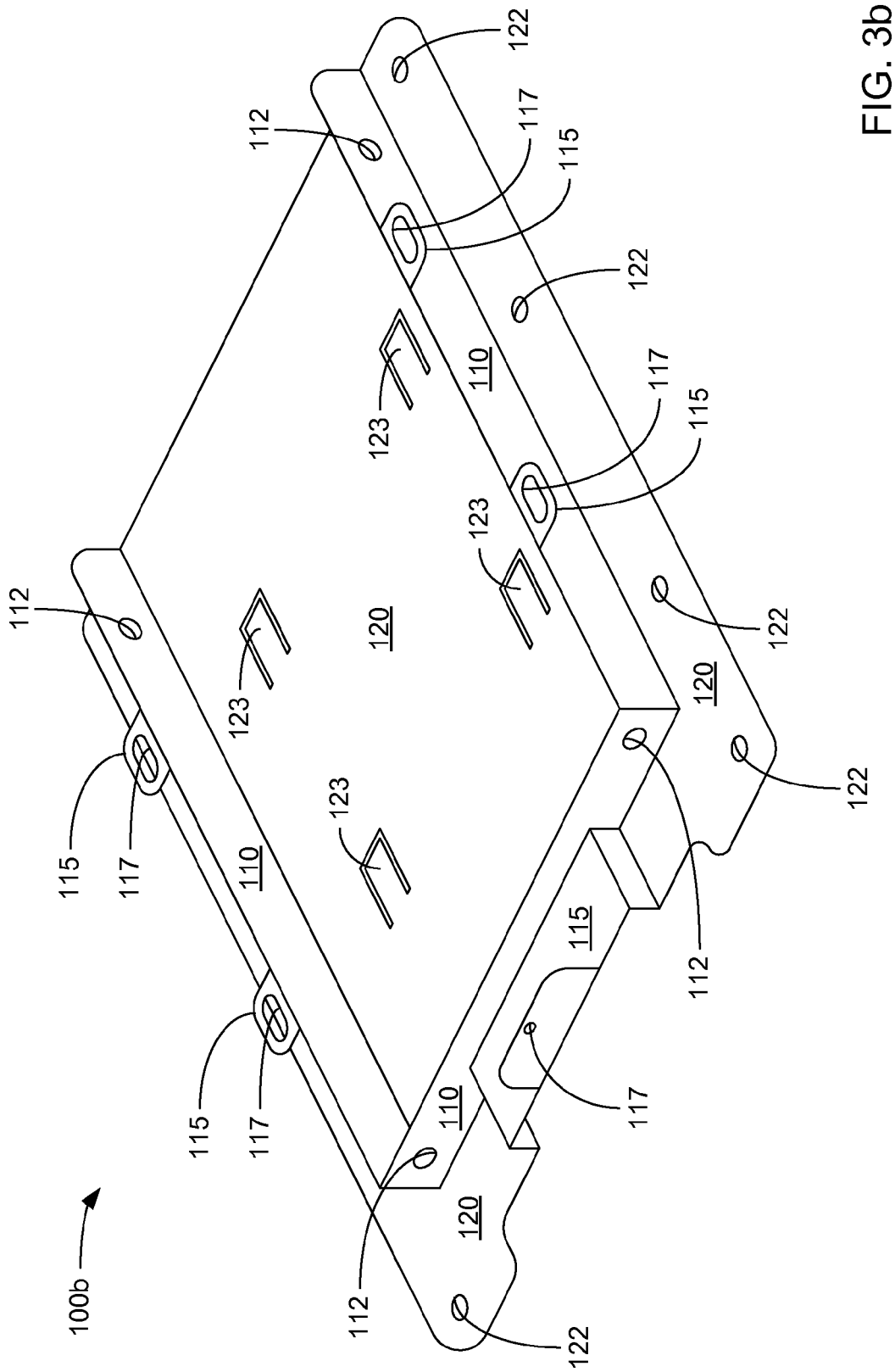
Figure 3C:
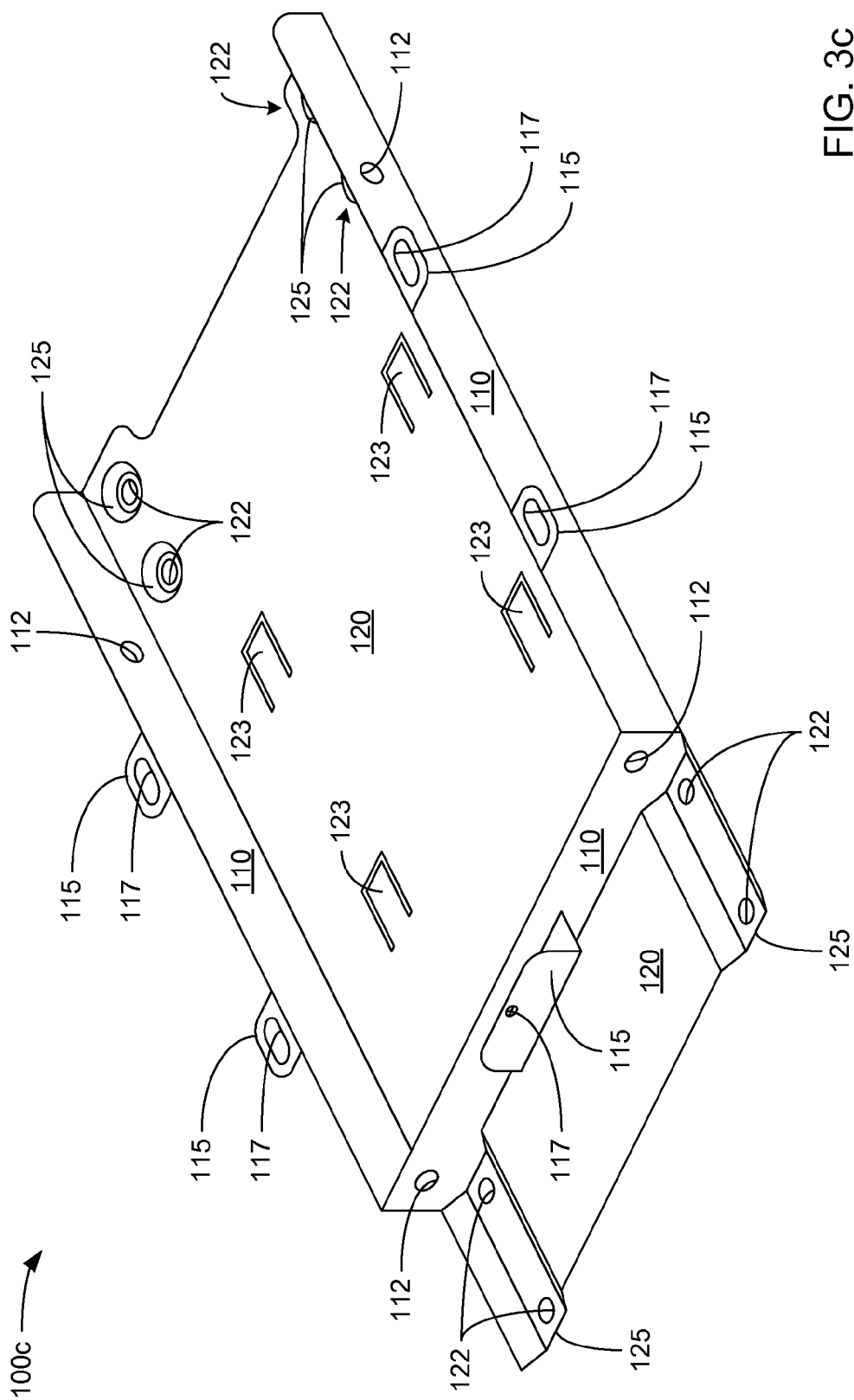

FIGS. 3a, 3b and 3c, together, provide perspective views of three variants 100a, 100b and 100c, respectively, of the floor plate 100 of FIGS. 1 and 2, and in greater detail. As with the floor plate 100, each of the floor plates 100a-c is made up principally of an upper portion 110 by which each of these floor plates is coupled to the lower frame 510, and a lower portion 120 by which each of these floor plates is coupled to a floor of a vehicle.

As depicted, the lower portion 120 of the floor plate 100 and of all three of the variants 100a-c is made up primarily of a flat, rectangular sheet of material, preferably metal, through which multiple apertures 122 are formed at various locations to enable bolts and/or other fasteners (possibly including threaded studs extending upward from the floor of a vehicle) to extended therethrough to couple each of these floor plates to a floor of a vehicle. In other words, the apertures 122 are formed at various positions about the lower portion 120 that correspond to mounting features of a vehicle floor, whether those mounting features are apertures formed through the floor, studs extending upwards from the floor, or still other mounting features. The lower portion 120 of the floor plates 100a and 100c have extensions 125 formed therein that extend downwardly from the plane of the flat, rectangular sheet of the lower portion 120 to engage a vehicle floor, and in which the apertures 122 are located. In contrast, the lower portion 120 of the floor plate 100b has no such extensions formed therein, and instead, the apertures 122 are formed through the lower portion 120 within the plane of the flat, rectangular sheet. Further, the lower portion 120 of all three of these floor plates 100a-c has tabs 123 cut therein that are depicted as remaining in the plane of the flat, rectangular sheet. However, possibly one or more of these tabs 123 may be bent out of the plane of that flat, rectangular sheet, either upwardly from that plane to engage portions of the lower frame 510 of the suspension 500 or downwardly from that plane to engage portions of the floor of a vehicle. Thus, one or more of the tabs 123 may be employed to couple the lower portion 120 to the lower portion 510 and/or the floor of a vehicle.

As also depicted, the upper portion 110 of all three of these floor plates 100a-c is made up of a ribbon of material, preferably metal, that is bent at two points (preferably, at right angles at those two points) along the length of the ribbon to impart a generally "U-shaped" configuration. One of the long edges of the ribbon of the upper portion 110 is joined to the lower portion 120 such that the combination of the U-shaped upper portion 110 and the flat, rectangular lower portion 120 cooperate to form what could be called a rectangular "tray" with upwardly extending walls along three sides with an upwardly extending edge. Multiple apertures 112 are formed through the upwardly extending walls of the upper portion 110 at various positions to enable bolts and/or other fasteners to extend therethrough to couple the lower frame 510 of the suspension assembly 500 to each of these floor plates. In some embodiments, the lower frame 510 may have threaded apertures (not shown) formed therethrough at locations corresponding to at least some of the locations of the apertures 112. The upper portion 110 of the floor plate 100a also carries one or more studs 113, depicted as projecting outwardly and generally parallel to the plane of the flat, rectangular sheet of the lower portion 120. In extending outwardly, each of the studs 113 may be oriented to extend into corresponding apertures formed in the material of the lower portion 310 of the skirt 300 to aid in coupling the lower portion 310 to the floor plate 100a. Alternatively and/or additionally, one or more of the studs 113 may positioned on the upper portion 110 to extend inwardly to engage the lower frame 510 to aid in coupling the lower frame 510 to the upper portion 110. Whether employed to couple the upper portion 110 to the lower portion 310 of the skirt 300 or to the lower frame 510, each of the studs 113 may or may not be threaded.

The upper portion 110 of all three of the floor plates 100a-c carry extensions 115 at various positions along the upwardly extending edge, with the extensions 115 extending outwardly and generally parallel to the plane of the flat, rectangular sheet of the lower portion 120. Each of the extensions 115 has an aperture 117 formed therethrough to enable bolts and/or other fasteners to couple the lower portion 310 of the skirt 300 to each of these floor plates. Alternatively and/or additionally, the material of the lower portion 310 may be shaped to engage the apertures 117, perhaps by having small portions of the material of the lower portion 310 extend through each of the apertures 117. Further, the floor plates 100b and 100c each have a larger variant of the extension 115 that extends outwardly from amidst an outward face of one of the upwardly extending walls defined by the upper portion 110, and incorporates a right-angled bend causing a portion of this larger variant of the extension 115 to then extend upwardly and generally parallel to the upwardly extending wall from which the larger variant of the extension 115 extends. The aperture 117 of this larger variant of the extension 115 is formed through its upwardly extending portion.

As further depicted, the flat, rectangular sheet of the lower portion 120 of the floor plates 100b and 100c may extend in various ways beyond the upwardly extending walls defined by the U-shaped upper portion 110, or in other words, beyond the periphery of the "tray" formed by the combination of the upper portion 110 and the lower portion 120. All of the apertures 122 of the floor plate 100b are depicted as being formed through such extending portions of the lower portion 120, and these extending portions are also coupled to the outwardly extending portion of the larger variant of the extension 115. In contrast, some of the apertures 122 of the floor plate 100c are depicted as being formed through a pair of the extensions 125 that are formed in such an extending portion of the lower portion 120, and the larger variant of the extension 115 is not coupled at any point to the lower portion 120.

As those skilled in the art will readily recognize, it is commonplace for each of the different manufacturers of vehicles to devise their own layout of mounting features (e.g., apertures formed through the floor, and/or threaded or unthreaded studs extending upwards from the floor) positioned about the floors of their vehicles by which seats are coupled thereto, and to not coordinate with each other to create common layouts of mounting features. Each of the floor plates 100 and 100a-c provides a different pattern of locations of the apertures 122, and this enables the active suspension seat 1000 to be installed into a variety of different vehicles through the use of whichever one of the floor plates 100 or 100a-c is appropriate for a given vehicle. In some embodiments, one or more of the floor plates 100 and 100a-c may provide a pattern of locations of the apertures 122 that enables a single one of these floor plates to be employed in coupling the active suspension seat 1000 to the floor of more than one vehicle.

As those skilled in the art will also readily recognize, it is commonplace for some of such manufacturers to cover portions of the floor of a vehicle underneath a seat with rubber or other relatively resilient material for the comfort of persons within the vehicle, for aesthetic purposes and/or as a way of preventing persons from slipping on the floor of the vehicle. It is also commonplace, where such portions of a vehicle floor are so covered, to form openings through such resilient material about the locations of mounting features positioned about the floor (e.g., apertures and/or studs) to enable the seat provided by the manufacturer of a vehicle to be securely mounted directly to the floor, itself. The provision of the extensions 125 in the floor plates 100a and 100c enables the floor plates 100a and 100c to be securely coupled to such covered floors as a result of the extensions 125 extending downwardly through such openings formed in such resilient material to directly engage the floor at those locations. In this way, each of the floor plates 100a and 100c extends over such resilient material at locations between the openings formed through such resilient material, such that the resilient material is allowed to remain substantially undisturbed as the active suspension seat 1000 is installed, rather than needing to be removed.

As those skilled in the art will further readily recognize, it is commonplace for the seats normally installed by vehicle manufacturers within their vehicles to have a frame in the base of those seats that is directly coupled to the floor of their vehicles without the use of a floor plate. This is frequently facilitated by there being a lack of active suspension components located in amidst the frame of the base of their seats, resulting in the space beneath the top portion of their seats frequently being empty enough to facilitate the insertion of human hands or automated machinery therein to insert bolts and/or other fasteners in that empty space to directly couple the frame of the base to the floor.

However, as suggested by the depiction of the suspension components 550 and the controller 700 being positioned amidst the lower frame 510 and the upper frame 590 of the active suspension seat 1000, the space beneath the top 1900 is far less empty, making the insertion of either human hands or automated machinery therein to directly couple the lower frame 510 to a vehicle floor substantially more difficult. Further, even if there were sufficient room in the base 1400 amidst the lower frame 510 and the upper frame 590 to enable the insertion of human hands or automated machinery therein, this is likely to be deemed undesirable, since damage to components of the active suspension seat 1000 that are located therein and/or injury to persons attempting to couple the active suspension seat 1000 to a vehicle floor may result. The use of one of the floor plates 100 and 100a-c obviates the need to insert either human hands or automated machinery amidst the lower frame 510 and the upper frame 590 by enabling one of these floor plates to be coupled to a vehicle floor with relative ease, which in turn, enables the remainder of the active suspension seat 1000 to be installed by coupling the lower frame 510 to the upper portion 110 of the floor plate 100. As previously discussed, the lower frame 510 is coupled to the upper portion 110 through the insertion of bolts and/or other fasteners through the apertures 112 formed through the upper portion 110, and perhaps into corresponding threaded apertures formed in the lower frame 510. Thus, the installation of the active suspension seat 1000 is also made easier than is customary with the seats normally installed by a vehicle manufacturer, since it is frequently easier for human hands and/or automated machinery to reach around the exterior of the base of a seat (such as the base 1400) than to reach into the base of a seat, regardless of whether there is much empty space with the base of a seat, or not.

The use of one of the floor plates 100 or 100*a-c* to couple the active suspension seat 1000 to a vehicle floor also increases the strength and/or rigidity of the section of the vehicle floor that supports the active suspension seat 1000. The active suspension seat 1000 is likely to be considerably heavier than the majority of seats installed by vehicle manufacturers into their vehicles, and thus, a vehicle floor may not be able to support the added weight without flexing to an extent deemed to be undesirable. As previously discussed, active suspension components of the suspension 500 are operated by the controller 700 to cause at least the upper frame 590 and the suspended portion 900 (along with a person sitting thereon) to be moved relative to the lower frame 510 and a vehicle floor. A vehicle floor may not be able to withstand the forces exerted on it as the at least the upper frame 590 and the suspended portion 900 are caused to move in such ways. To put this another way, at least the upper frame 590 and the suspended portion 900 are caused by the provision of active suspension to be pushed away from and pulled toward the vehicle floor at various times, and in rapid succession, such that the vehicle floor is being variously pulled upward and pushed downward. The coupling of one of the floor plates 100 and 100*a-c* to a vehicle floor strengthens and increases the rigidity the vehicle floor in a manner not unlike the lamination of multiple layers of material together can impart increased strength and rigidity. Further, the coupling of one of the floor plates 100 and 100*a-c* to a vehicle floor may also more widely distribute the forces exerted on a vehicle floor across more of that vehicle floor (more so where the lower portion 120 extends beyond the upper portion 110), thereby possibly further reducing flexing of that vehicle floor.

Figure 4A:
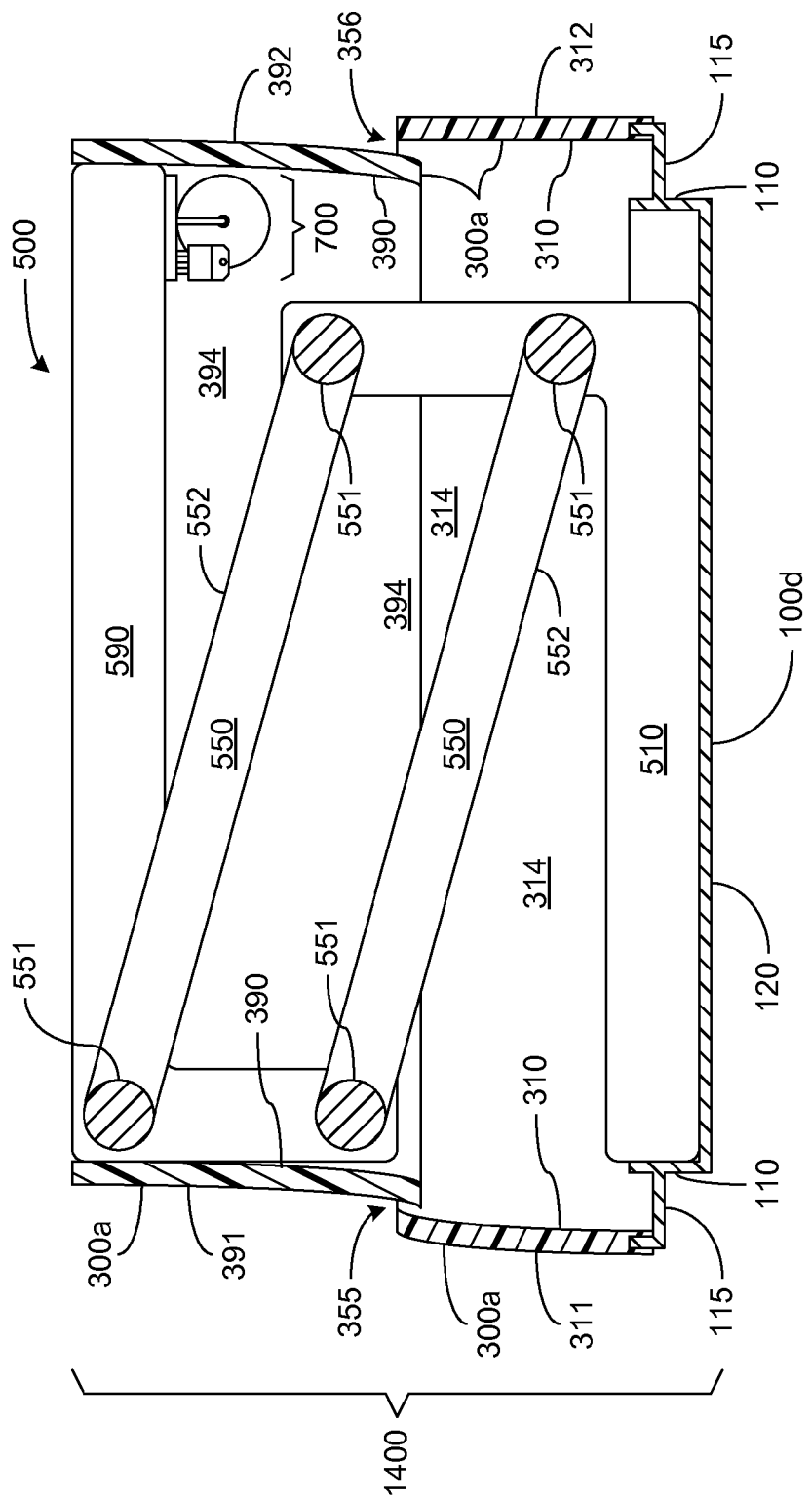
FIGS. 4a and 4b are cross-section views of portions of the active suspension seat of FIG. 1, depicting the suspension of a controller of the active suspension seat; and that taken together, depict movement of an upper frame of a suspension of the active suspension seat relative to a lower frame of the suspension, as well as the resulting movement of an upper portion of a skirt of the active suspension seat relative to a lower portion of the skirt.
Figure 4B:
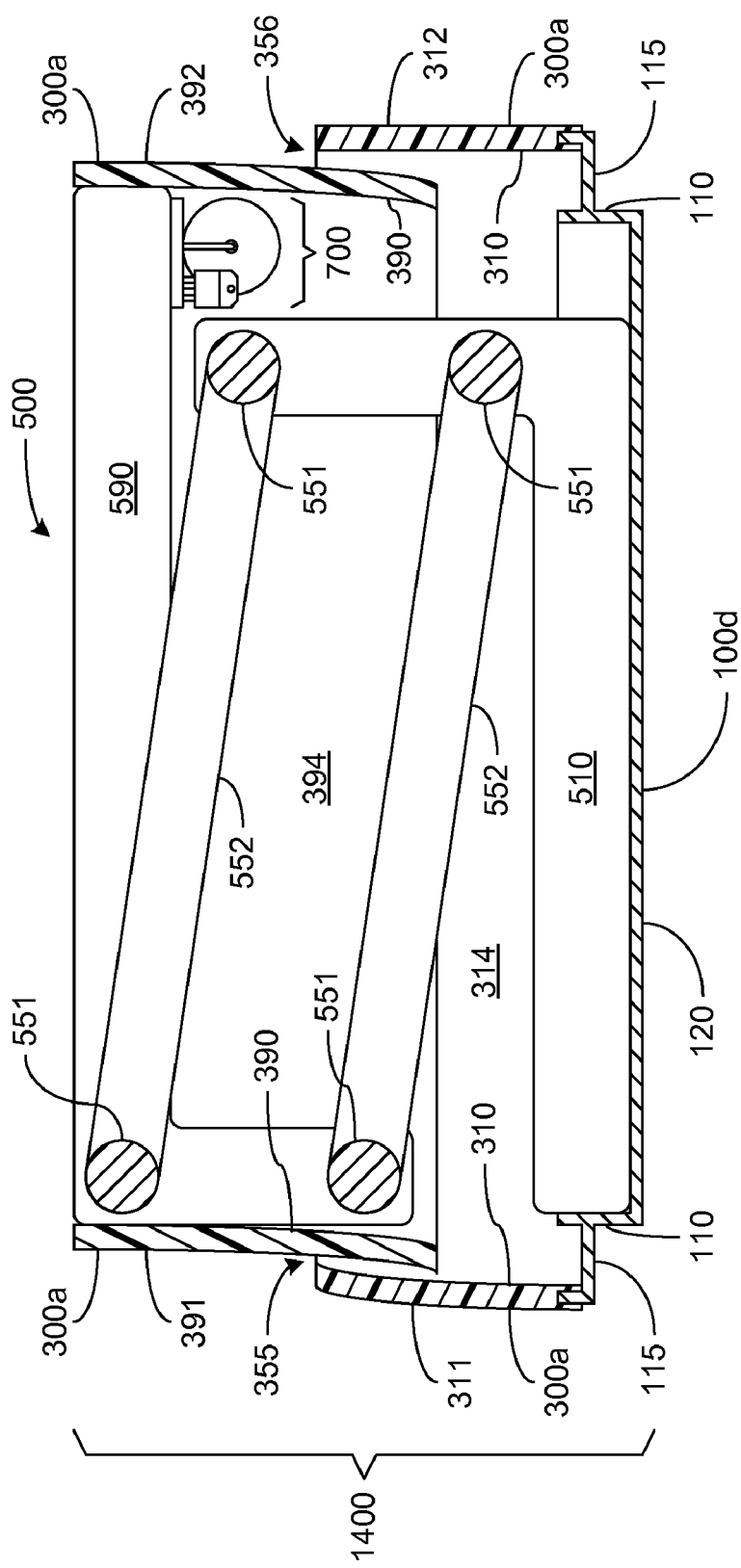

FIGS. 4*a* and 4*b*, together, provide cross-section views of the base 1400 of a variant of the active suspension seat 1000 that, taken together, depict the relative movement of portions of a variant 300*a* of the skirt 300 of FIGS. 1 and 2 in response to movement of the upper frame 590 of the suspension 500 relative to the lower frame 510, which is coupled to another variant 100*d* of the floor plate 100. As with the skirt 300 and floor plate 100, the skirt 300*a* is made up principally of a lower portion 310 coupled to the upper portion 110 (more specifically, to one or more of the extensions 115 of the upper portion 110) of the floor plate 100*d* and an upper portion 390 coupled to the upper frame 590.

As depicted in FIGS. 4*a-b*, as well as in FIG. 2, the upper frame 590 is coupled to the lower frame 510 by a pair of the suspension components 550. As depicted, each of the suspension components 550 is made up of a pair of rotating bars 551 that are joined by a pair of pivoting bars 552 extending therebetween. Ends of one of the rotating bars 551 of each of the suspension components 550 are rotatably coupled to the lower frame 510, and ends of the other of the rotating bars 551 of each of the suspension components 550 are rotatably coupled to the upper frame 590. These rotatable couplings between the rotating bars 551 and each of the lower frame 510 and the upper frame 590 may be formed in any of a variety of ways that will be familiar to those skilled in the art. All of the pivoting bars 552 are of equal length. Also, the distance between the points at which two of the rotating bars 551 are rotatably coupled to portions of the lower frame 510 are equal to the distance between the points at which the other two of the rotating bars 551 are rotatably coupled to portions of the upper frame 510. As a result, the pivoting bars 552 and the portions of lower and upper frames 510, 590 to which the rotating bars 551 are rotatably coupled form a parallelogram that is clearly depicted in FIGS. 4*a-b*. As can also be clearly seen by comparing FIGS. 4*a* and 4*b*, the angles of the corners of this parallelogram are alterable in a manner that corresponds to a curvilinear movement of the upper frame 590 relative to the lower frame 510 (i.e., a curvilinear movement of the top 1400 relative to a vehicle floor).

The formation of this parallelogram with alterable corner angles provides the suspension 500 with a very strong support structure that also permits this curvilinear movement of the upper frame 590 relative to the lower frame 510 that enables the provision of active suspension of the upper portion of the active suspension seat relative to a vehicle floor. However, as those skilled in the art will readily recognize, alternate forms of the suspension components 550 may be employed to form such a parallelogram, including an alternate structure in which the rotating bars 551 are rigidly (such that they do not actually rotate) coupled to the lower and upper frames 510, 590, and the corners of the parallelogram are made alterable by way of the pivoting bars 552 being pivotally coupled to the rotating bars 551. Further, as those skilled in the art will readily recognize, still other variations of structure may be employed by the suspension 500 to form such a parallelogram and/or another geometric configuration that causes the top 1400 to move relative to a vehicle floor with a curvilinear motion as a result of the provision of active suspension.

As those skilled in the art of active suspension will readily recognize, although FIGS. 4*a-b* depict the suspension components 550 that provide an alterable structure to enable the provision of active suspension, FIGS. 4*a-b* do not depict other suspension components that actually cause the movement of the upper frame 590 relative to the lower frame 510 to cause the provision of active suspension. This has been done by choice to facilitate ease of understanding of FIGS. 4*a-b* by avoiding the unnecessary depiction of some components, and should not be taken as limiting the scope of either the disclosure or claims herein. As those skilled in the art will readily understand, the suspension 500 must incorporate one or more linear and/or rotary actuators of some form to cause the provision of active suspension, including and not limited to one or more of, pneumatic cylinders, hydraulic cylinders, rotary motors or linear motors. Further, as was previously discussed, it is expected that such linear and/or rotary actuators would be located amidst portions of the suspension components 550.

In keeping with what has been previously discussed, the lower frame 510 and the lower portion 310 of the skirt 300*a* are coupled to the upper portion 110 of the floor plate 100*d*, and the lower portion 120 of the floor plate 100*d* enables the active suspension seat 1000 to be coupled to the floor of a vehicle. Also, the upper portion 390 of the skirt 300*a* is coupled to the upper frame 590. Unlike the skirt 300 of FIGS. 1 and 2, the lower portion 310 of the skirt 300*a* has all three of the lower front, lower left and lower right portions 311, 313 and 314, respectively, and additionally has a lower back portion 312. Similarly, the upper portion 390 has all three of the upper front, upper left and upper right portions 391, 393 and 394, respectively, and additionally has an upper back portion 392. The floor plate 100d has at least a pair of the extensions 115 by which the lower front portion 311 and the lower back portion 312 are coupled to the floor plate 100d. As depicted, this coupling is made by the material of each of the lower front and lower back portions 311, 312 enveloping a portion of one of the depicted extensions 115. Within the area of this envelopment may be one or more fasteners and/or portions of adhesive that aid in forming this coupling. Further, any of a variety of fasteners and/or portions of adhesive may be employed in coupling at least the upper front and upper back portions 391, 392 to the upper frame 590.

As depicted, the lower front portion 311 and the upper front portion 391 both have generally curved cross-sections with the concave faces of those curves at least partly facing towards each other. In at least some embodiments, the curves of the lower front portion and upper front portion 311, 391 are substantially similar, and are at least partly defined by the arc of movement followed by an end of one of the pivoting bars 552 that is coupled through one of the rotating bars 551 to the upper frame 590 as the upper frame 590 is caused to move relative to the lower frame. These concave faces are positioned relative to each other in a manner that leaves a gap 355 between them along an upper edge of the lower front portion 311. Again, as those skilled in the art will readily recognize, the parallelogram with alterable corner angles defined by the combination of the pivoting bars 552 and portions of the lower and upper frames 510, 590 impart something of a forward-backward movement (again, "forward" and "backward" from the perspective of a person sitting in the suspended portion 900 of the active suspension seat 1000) of the upper frame 590 relative to the lower frame 510 as the upper frame 590 moves upwardly-downwardly relative to the lower frame 510. In essence, as previously discussed, this parallelogram causes the upper frame 590 to actually move in a curvilinear motion relative to the lower frame 510. The concave faces of the front portions 311 and 391 of the skirt 300a have curves that enable the size of the gap 355 (i.e., the distance between the upper edge of the lower front portion 311 and the concave face of the upper front portion 391) to remain substantially unchanged as the upper front portion 391 is moved relative to the lower front portion 311 as the upper frame 590 is caused to move in its curvilinear motion relative to the lower frame 510.

Somewhat similarly, the upper back portion 392 has a generally curved cross-section with a curvature substantially similar to the curvature of the upper front portion 391. The convex face of the curve of the upper back portion 392 faces the lower back portion 312, which as depicted, has a substantially flat cross-section that does not correspond to the curve of the lower front portion 311. The convex face of the upper back portion 392 is positioned relative to the lower back portion 312 in a manner that leaves a gap 356 between them along an upper edge of the lower back portion 312. The curve of the convex face of the upper back portion 392 enables the size of the gap 356 (i.e., the distance between the upper edge of the lower back portion 312 and the convex face of the upper back portion 392) to remain substantially unchanged as the upper back portion 392 is moved relative to the lower back portion 312.

The gaps 355 and 356 are of sizes selected to ensure that the lower front portion 311 and the upper front portion 391 do not come into contact with each other and to similarly ensure that the lower back portion 312 and the upper back portion 392 do not come into contact with each other. However, the gaps 355 and 356 are also of sizes selected to substantially prevent the entry of debris, hands and feet between either the lower and upper front portions 311, 391, or between the lower and upper back portions 312, 392. In some embodiments, it is preferred that the gaps 355 and 356 are within the range of 3 mm to 4 mm in width. As depicted in FIGS. 4a-b, the lower portion 310 and the upper portion 390 of the skirt 300a are sized such that the front portions 311 and 391 are positioned relative to each other and such that the back portions 312 and 392 are positioned relative to each other to cause the gaps 355 and 356 to open upward from a perspective external to the skirt 300a. Although this may raise a concern that a greater amount of dust or some amount of debris will be allowed to fall down through one or both of the gaps 355 and 356 such that resizing and repositioning the lower and upper portions 310, 390 to cause the gaps 355 and 356 to face downward would seem an appealing alternative, doing so may be deemed undesirable due to concerns of safety and/or comfort of a person sitting on the active suspension seat 1000. More specifically, were the lower and upper portions 310, 390 altered so that the upper front portion 391 is positioned in front of the lower front portion 311 (rather than behind the lower front portion 311, as depicted), then the upward-downward movement of the upper front portion 391 relative to the lower front portion 311 may result in a lower edge of the upper front portion 391 coming downward and into contact with the back of a shoe (or worse, the back of a foot) of a person sitting on the active suspension seat 1000. By positioning the upper front portion 391 behind the lower front portion 311 (as depicted), the back of a shoe and/or the back of a foot that is positioned against the lower front portion 311 is protected from the upward-downward movement of the upper front portion 391. For similar reasons, it may be deemed undesirable to position a variant of the upper back portion 392 behind a variant of the lower back portion 312 (rather than in front of the lower back portion 312, as depicted), since doing so may raise the concern of a lower edge of such an upper back portion 392 coming downward and into contact with the front of a shoe (or worse, one or more toes) of a person sitting on another seat that is positioned behind the active suspension seat 1000.

This use of such curves to provide gaps (i.e., the gaps 355 and 356) of substantially constant size enables the use of relatively stiff materials in forming the lower and upper portions 310, 390. This opportunity to use relatively stiff materials obviates the need a skirt having a "bellows-like" or "accordion-like" structure (or other flexible form of skirt) that would be subject to accelerated wear and tear due to frequent and repeated movement of the upper frame 590 relative to the lower frame 510 as a result of the provision of active suspension. This stiffness of the lower and upper portions 310, 390 provides a number of advantages over the use of flexible materials in forming a skirt, including the ability of the resulting skirt (300 or 300a) to better protect components of the suspension 500 from impacts, provide flat surfaces within the base 1400 to which various components may be securely coupled, and/or more easily provide electromagnetic shielding. The use of more flexible materials in forming a skirt may allow the force of even a minor impact (e.g., an accidental kick by someone wearing shoes) to reach components of the suspension 500, while the use of stiffer materials enables such impacts to be entirely absorbed by the skirt 300 or 300a, leaving components of the suspension 500 unaffected. Lighter weight components (e.g., electronic components on circuitboards, sensors and/or manually-operable controls) may be more securely mounted to interior surfaces if the skirt 300 or 300a is formed from such stiffer materials. Electromagnetic shielding materials that tend to be stiff (and perhaps brittle) may be applied to interior surfaces of the skirt 300 or 300a, if the skirt 300 or 300a is formed from such stiffer materials, while the use of more flexible materials to form the skirt 300 or 300a may require such shielding to be provided through the use of sheets of interwoven metal wires, which tend to be more costly and would be subject to accelerated wear as the upper frame 590 moves relative to the lower frame 510.

In addition to protecting components of the suspension 500 from impacts, the skirt 300a also provides similar protection (including ease of shielding) to the controller 700, which is depicted in FIGS. 4a-b as a circuitboard to which various electronic components are mounted. As depicted in FIG. 2, as well as in FIGS. 4a-b, the controller is further protected by being coupled to the upper frame 590 (or at least some other component of the active suspension seat that is coupled to the upper frame 590), rather than being coupled to the lower frame 510 (or at some other component that is coupled to the lower frame 510, such as the floor plate 100). In so doing, the controller 700, which may be made up of one or more rather delicate components, is provided with the same isolation from jolts to which a vehicle is subjected during vehicle travel as a person sitting on the active suspension seat 1000. Providing such isolation to electrical and/or electronic components can prevent wearing of electrical connections due to vibration, damage to complex structures within electronic components (e.g., the sometimes delicate arrangement of materials within a capacitor), and/or false switching of electromechanical components (e.g., undesired movement of pivoting contacts in a relay).

In addition to or in lieu of the controller 700 being coupled to the upper frame 590 (or some other component that is also actively suspended), one or more components of the suspension 500, itself, may be similarly actively suspended to similarly prevent damage. By way of example, power supplies, gas and/or fluid reservoirs, valves, power transistors, power rectifiers, coils, manifolds and/or magnets may be actively suspended as by being coupled to the upper frame 590 (directly or indirectly) to isolate them from jolts to which a vehicle is subjected during travel. In selecting what components are to be actively suspended, the addition of their mass to the total mass that is actively suspended must be taken into account in the design of the suspension 500, and perhaps also in the design of the floor plate 100d.

Figure 5:
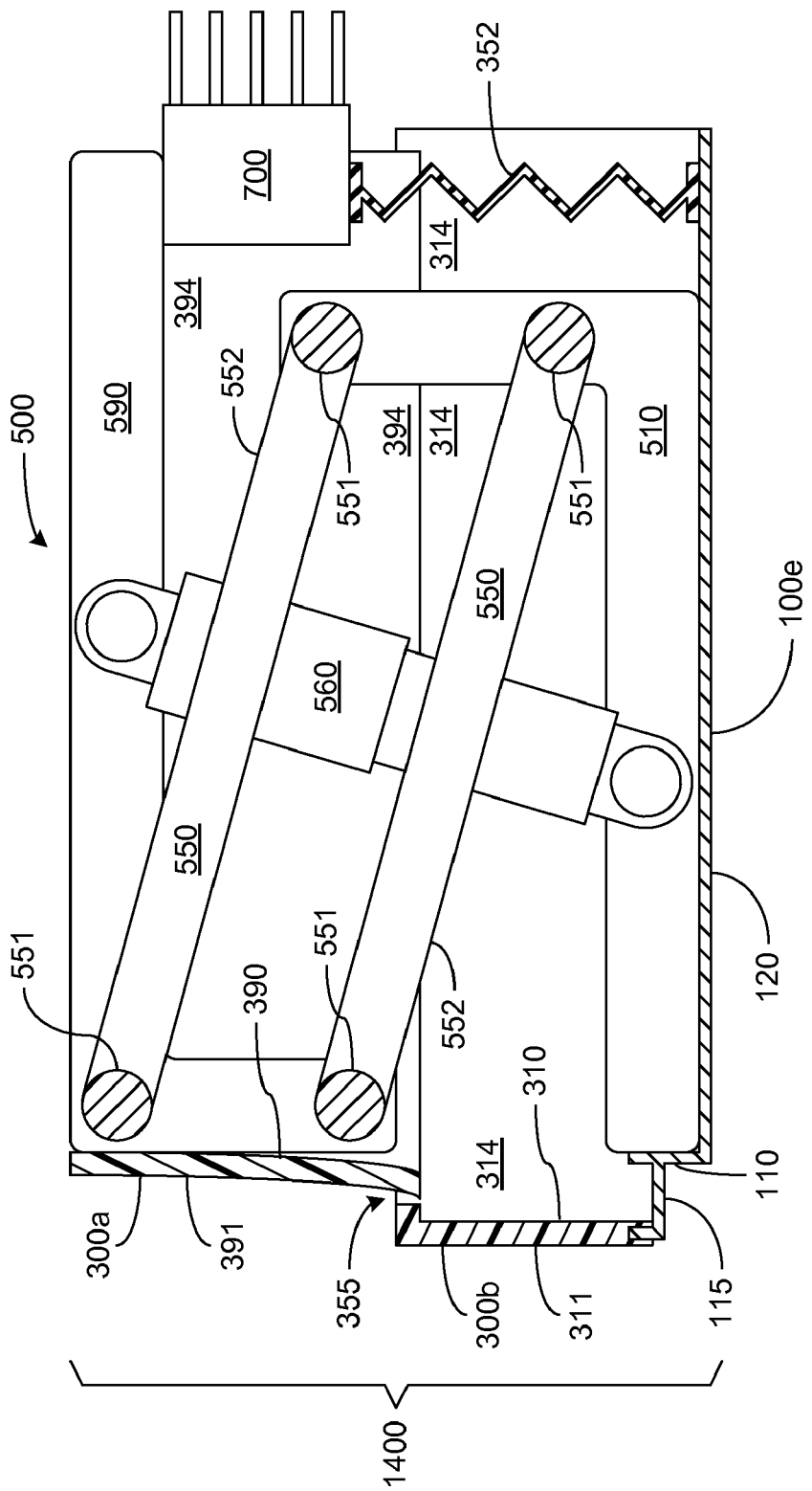
FIG. 5 is another cross-section view of portions of a variant of the active suspension seat of FIG. 1, depicting the suspension of a different controller, and depicting upper and lower portions of a different skirt.

FIG. 5 provides a cross-section view of the base 1400 of another variant of the active suspension seat 1000 that incorporates another variant 300b of the skirt 300 and another variant 100e of the floor plate 100. As with the skirt 300 and floor plate 100, the skirt 300b is made up principally of a lower portion 310 coupled to the upper portion 110 of the floor plate 100e and an upper portion 390 coupled to the upper frame 590. Unlike FIGS. 4a-b, where a deliberate decision was made to avoid excessive visual clutter by not depicting active suspension components, in FIG. 5, an active suspension component 560 is depicted as coupled to both the lower and upper frames 510, 590, and as being positioned amidst the suspension components 550. The active suspension component 560 may be any of a variety of types of active suspension component, including and not limited to, a linear actuator, a rotary actuator, a pneumatic cylinder, or a hydraulic cylinder. Whatever the technology on which the active suspension component 560 is based, in the manner previously discussed, the controller 700 operates the active suspension component 560 to cause the upper frame 590 to move relative to the lower frame 510 as part of providing active suspension of the suspended portion 900 relative to the floor of a vehicle.

In keeping with what has been previously discussed, the lower frame 510 and the lower portion 310 of the skirt 300b are coupled to the floor plate 100e, and the floor plate 100e enables the active suspension seat 1000 to be coupled to the floor of a vehicle. Also, the upper portion 390 of the skirt 300b is coupled to the upper frame 590. Like the skirt 300 of FIGS. 1 and 2, the lower portion 310 of the skirt 300b has the lower front, lower left and lower right portions 311, 313 and 314, respectively; and the upper portion 390 has the upper front, upper left and upper right portions 391, 393 and 394. The floor plate 100e has at least one of the extensions 115 by which the lower front portion 311 is coupled to the floor plate 100e. However, in lieu of having either of the lower back portion 312 or the upper back portion 392, the exterior of the back side of the suspension 500 is made up of heatsink fins of a casing of an alternate form of the controller 700 coupled to the upper frame 590 and a back cover 352 made up of an accordion-like piece of flexible material extending between a portion of the casing of the alternate form controller 700 and the floor plate 100e. In the case of embodiments of the active suspension seat 1000 that are installed in vehicles in which there isn't another seat located behind the active suspension seat 1000, use of the accordion-like back cover 352 may be deemed more desirable than use of the lower and upper back portions 312, 392 to reduce costs.

As depicted, the upper front portion 391 has a generally curved cross-section, while the lower front portion 311 of the lower portion 310 does not. Instead, the lower front portion 311 has a generally "L-shaped" cross-section with a horizontal portion of the "L-shape" defining a horizontally extending "lip" that cooperates with the concave face of the upper front portion 391 to define the gap 355 therebetween, and that sets a vertical portion of the "L-shape" of the lower front portion 311 far enough forward of the upper front portion 391 that a lower edge of the upper front portion 391 does not make contact with the lower front portion 311 as the upper front portion 391 is moved relative to the lower front portion 311. Use of this variant of the lower front portion 311 with this "L-shaped" cross-section may be deemed more desirable than use of the curved variant of the lower front portion 311 depicted in FIGS. 4a-b, since the "L-shaped" cross-section may impart greater strength to the lower front portion 311, which may be subjected to more frequent impacts from the shoes of a person sitting on the active suspension seat 1000.

As previously discussed, the provision of a floor plate (i.e., one of the floor plates 100 or 100a-e) enables the installation of the active suspension seat 1000 into a vehicle to be conducted with greater ease. More specifically, the installation of the active suspension seat 1000 begins principally with the coupling of one of the floor plates 100 or 100a-e to a vehicle floor. Since the rest of the active suspension seat 1000 is installed subsequent to the coupling of one of these floor plates to the vehicle floor, the rest of the active suspension seat 1000 is not present and in the way as one of these floor plates is so coupled, and therefore, each bolt and/or other fastener employed to do this is made more readily accessible.

The installation of the active suspension seat 1000 continues with the coupling of much of the rest of the active suspension seat 1000 to whichever one of the floor plates 100 or 100a-e has been installed, but with installation of a skirt to come later. As previously described, the positioning of the apertures 112 about the upper portion 110 enables bolts and/or other fasteners to be inserted through the apertures 112 and into corresponding apertures formed in the lower frame 510 from outside the base 1400 with relative ease, rather than requiring such bolts or other fasteners to be installed from within the space occupied by components of the suspension 500. Where the corresponding apertures of the lower frame 510 are threaded so as to receive threaded ends of bolts inserted through the apertures 112, and/or where the upper portion 110 carries one or more pins 113 that extend into corresponding apertures of the lower frame 510, the coupling of the lower frame 510 to the upper portion 110 is made easier still.

In coupling the lower frame 510 to the upper portion 110, it has been found to be advantageous to configure the upper portion 110 to define three vertical walls, as has been previously discussed, to allow a worker to at least partly slide the active suspension seat 1000 atop the lower portion 120 and into place amidst the vertical walls defined by the upper portion 110. This has been found to be less challenging to a worker than configuring the upper portion 110 to define four vertical walls such that a worker would be required to carry the weight of the much of the active suspension seat 1000 while having to first align the lower frame 510 with those four walls, before being able to lower the active suspension seat 1000 into place amidst those four walls. Further, although the three walls defined by the upper portion 110 have been repeatedly depicted as being oriented to have a front, a left and a right wall, while having no back wall such that the "U-shape" of the upper portion 110 can be said to "open" rearwardly, it is to be understood that the three walls defined by the upper portion 110 may be oriented in any of a variety of ways. More specifically, the three walls may be configured to be oriented such that there are left, right and back walls, but no front wall such that the "U-shape" can be said to "open" forwardly; or oriented such that there are front and back walls, but one or the other of the left and right walls is not present such that the "U-shape" can be said to "open" rightwardly or leftwardly, respectively. However, it has been found to be advantageous to configure the three vertical walls defined by the upper portion 110 to form a "U-shape" that "opens" rearwardly (i.e., there is no back wall) as it is likely that a worker will be installing the active suspension seat 1000 from a front driver's door of a vehicle, and is likely to be holding the active suspension seat 1000 from the front. Given this, such a worker will be able to more easily judge how well he/she is positioning the lower frame 510 amidst the three walls if those three walls are visible to him/her, and this is more easily possible if there are front, left and right walls defined by the upper portion 110 such that the worker can more easily see portions of all three of those walls while holding the active suspension seat 1000 from its front side.

The installation of the active suspension seat 1000 further continues with the installation of one of the skirts 300 or 300a-b about the base 1400. As previously discussed, the upper portion 390 is coupled to the upper frame 590 using any of a variety of fasteners and/or portions of adhesive. The lower portion 310 is coupled to the upper portion 110 of whichever one of the floor plates 100 or 100a-e has been installed, using any of a variety of fasteners, portions of adhesive, one or more outwardly extending pins 113 that may be carried by the upper portion 110, and/or one or more extensions 115 that may be carried by the upper portion 110.

Other implementations are within the scope of the following claims and other claims to which the applicant may be entitled.

The invention claimed is:

1. A method of installing an active suspension seat in a vehicle comprising:
coupling a floor plate to a floor of a vehicle, wherein the floor plate has a first plurality of apertures that correspond to a plurality of mounting features positioned about the floor to enable the floor plate to be coupled to the floor; and
coupling the active suspension seat to the floor plate, wherein:
the floor plate having a second plurality of apertures that correspond to a plurality of apertures formed in a lower frame of the active suspension seat to enable the active suspension seat to be coupled to the floor plate; and
coupling the active suspension seat to the floor plate comprises inserting fasteners through the second plurality of apertures and into the corresponding apertures of the lower frame, wherein the second plurality of apertures are located at positions on the floor plate that enable the fasteners to be inserted from locations external to the active suspension seat.

2. The method of claim 1, further comprising:
coupling an upper portion of a skirt to an upper frame of the active suspension seat that is structured to be actively suspended above a lower frame of the active suspension seat; and
coupling a lower portion of the skirt to the floor plate.

3. The method of claim 1, wherein:
the floor plate comprises a flat sheet of material and a ribbon of material bent at two locations and joined to the flat sheet of material to form a tray having three side walls; and
coupling the floor plate to the floor of the vehicle comprises positioning the floor plate on the floor such that the tray having three side walls opens rearwardly.

4. The method of claim 3, wherein coupling the active suspension seat to the floor plate comprises:
positioning the lower frame between two of the three side walls;
sliding the lower frame forward to engage the other one of the three side walls; and
inserting a fastener through an aperture of the second plurality of apertures formed through at least one of the three side walls and at least partly into a corresponding aperture formed in the lower frame.

5. An apparatus comprising:
an upper frame coupled to a seat cushion providing a place on which a person may sit;
a lower frame;
a suspension comprising suspension components and a controller that cooperate to couple the upper frame to the lower frame and to actively suspend the upper frame relative to the lower frame; and
a floor plate comprising:
a first plurality of apertures formed therethrough that correspond to a plurality mounting features positioned about a floor of a vehicle to enable the floor plate to be coupled to the first floor; and
a second plurality of apertures formed therethrough that correspond to a plurality of apertures formed in the lower frame enabling fasteners to be inserted through the second plurality of apertures and into corresponding ones of the plurality of apertures of the lower frame to couple the lower frame to floor plate, wherein the second plurality of apertures are located at positions on the floor plate that enable the fasteners to be inserted from locations external to the apparatus.

6. The apparatus of claim 5, further comprising:
an upper portion of a skirt structured to be coupled to the upper frame; and
a lower portion of the skirt structured to be coupled to the floor plate.

7. The apparatus of claim 5, wherein:
the floor plate comprises a flat sheet of material and a ribbon of material bent at two locations and joined to the flat sheet of material to form a tray having three side walls; and
coupling the floor plate to the floor of the vehicle comprises positioning the floor plate on the floor such that the tray having three side walls opens rearwardly.

8. The apparatus of claim 7, wherein:
coupling the lower frame to the floor plate comprises positioning the lower frame between two of the three side walls, and sliding the lower frame forward to engage the other one of the three side walls; and
the second plurality of apertures are formed through at least one of the three side walls, and coupling the lower frame to floor plate comprises inserting a fastener through an aperture of the second plurality of apertures and at least partly into a corresponding aperture formed in the lower frame.

9. The apparatus of claim 8, wherein two of the three side walls defined by the three portions of the ribbon extend in parallel planes, imparting a U-shape configuration to the ribbon and enabling parallel portions of the lower frame to be positioned therebetween.

10. The apparatus of claim 7, wherein each of the three side walls extends in a plane that is perpendicular to the plane of the flat sheet of material.

11. The apparatus of claim 7, wherein another plurality of apertures are formed through the flat sheet of material that correspond to a plurality of mounting features positioned about another floor of another vehicle.

12. The apparatus of claim 7, wherein a plurality of extensions extend downwardly from the plane of the flat sheet of material to reach through corresponding openings formed in a layer of resilient material disposed between the floor and floor plate to engage the floor plate at locations corresponding to the first plurality of apertures.

13. The apparatus of claim 7, wherein a pin is carried by one of the three side walls and extends outwardly from the tray to engage a lower portion of a skirt structured to surround the lower frame.

14. The apparatus of claim 7, wherein an extension is carried by one of the three side walls and extends outwardly from the tray to engage a lower portion of a skirt structured to surround the lower frame.

15. The method of claim 4, wherein two of the three side walls defined by the three portions of the ribbon extend in parallel planes, imparting a U-shape configuration to the ribbon and enabling parallel portions of the lower frame to be positioned therebetween.

16. The method of claim 3, wherein each of the three side walls extends in a plane that is perpendicular to the plane of the flat sheet of material.

17. The method of claim 3, wherein another plurality of apertures are formed through the flat sheet of material that correspond to a plurality of mounting features positioned about another floor of another vehicle.

18. The method of claim 3, wherein a plurality of extensions extend downwardly from the plane of the flat sheet of material to reach through corresponding openings formed in a layer of resilient material disposed between the floor and floor plate to engage the floor plate at locations corresponding to the first plurality of apertures.

19. The method of claim 3, wherein a pin is carried by one of the three side walls and extends outwardly from the tray to engage a lower portion of a skirt structured to surround the lower frame.

20. The method of claim 3, wherein an extension is carried by one of the three side walls and extends outwardly from the tray to engage a lower portion of a skirt structured to surround the lower frame.

* * * * *